US009392539B2

(12) United States Patent  
Yeh et al.

(10) Patent No.: US 9,392,539 B2  
(45) Date of Patent: Jul. 12, 2016

(54) USER EQUIPMENT AND METHOD FOR FEEDBACK OF USER EQUIPMENT PERFORMANCE METRICS DURING DYNAMIC RADIO SWITCHING

(71) Applicant: Intel IP Corporation, Santa Clara, CA (US)

(72) Inventors: Shu-Ping Yeh, Campbell, CA (US); Nageen Himayat, Fremont, CA (US); Shilpa Talwar, Cupertino, CA (US); Alexander Sirotkin, Petach Tikva (IL)

(73) Assignee: Intel IP Corporation, Santa Clara, CA (US)

( * ) Notice: Subject to any disclaimer, the term of this patent is extended or adjusted under 35 U.S.C. 154(b) by 24 days.

(21) Appl. No.: 14/107,400

(22) Filed: Dec. 16, 2013

(65) Prior Publication Data

US 2014/0323133 A1     Oct. 30, 2014

Related U.S. Application Data

(60) Provisional application No. 61/816,662, filed on Apr. 26, 2013.

(51) Int. Cl.
 *H04W 36/00* (2009.01)
 *H04W 48/18* (2009.01)
 (Continued)

(52) U.S. Cl.
 CPC ........... *H04W 48/18* (2013.01); *H04J 11/0023* (2013.01); *H04L 5/0032* (2013.01);
 (Continued)

(58) Field of Classification Search
 CPC ..... H04N 7/141; H04W 60/00; H04W 88/02; H04W 76/048; H04W 8/005; H04W 28/0289; H04W 36/0066; H04W 52/0212; H04W 72/0486; H04L 65/1073; H04L 5/0032; H04L 65/1016

USPC ........ 455/436–444, 432.1–434; 370/321–334  
See application file for complete search history.

(56) References Cited

U.S. PATENT DOCUMENTS 5,331,413 A   7/1994  Diner  
5,617,422 A   4/1997  Litzenberger et al.  
(Continued)

FOREIGN PATENT DOCUMENTS

CN    105009482 A   10/2015  
CN    105052109 A   11/2015  
(Continued)

OTHER PUBLICATIONS

"3rd Generation Partnership Project; Technical Specification Group Radio Access Network; Evolved Universal Terrestrial Radio Access (E-UTRA); Physical layer procedures (Release 11)", 3GPP TS 36.213 V11.4.0, (Sep. 2013), 182.

(Continued)

*Primary Examiner* — Ronald Eisner  
(74) *Attorney, Agent, or Firm* — Schwegman Lundberg & Woessner, P.A.

(57) ABSTRACT

An embodiment of a method for user equipment feedback of performance metrics during dynamic radio switching is disclosed. The method may include the UE receiving an indication to switch from a first radio associated with a first radio access technology (RAT) of a communication system to a second radio associated with a second RAT of the communication system. The UE transmits the performance metrics to the second radio and switches from a first radio of the plurality of radios to a second radio of the plurality of radios, the first radio associated with the first RAT and the second radio associated with the second RAT.

9 Claims, 3 Drawing Sheets

(51) Int. Cl.

| | | |
|---|---|---|
| *H04N 7/14* | (2006.01) | |
| *H04W 28/02* | (2009.01) | |
| *H04W 72/04* | (2009.01) | |
| *H04W 52/02* | (2009.01) | |
| *H04W 76/04* | (2009.01) | |
| *H04W 8/00* | (2009.01) | |
| *H04L 5/00* | (2006.01) | |
| *H04W 88/02* | (2009.01) | |
| *H04W 60/00* | (2009.01) | |
| *H04L 29/06* | (2006.01) | |
| *H04W 8/22* | (2009.01) | |
| *H04J 11/00* | (2006.01) | |
| *H04W 24/06* | (2009.01) | |
| *H04W 72/12* | (2009.01) | |
| *H04L 12/801* | (2013.01) | |
| *H04W 76/06* | (2009.01) | |
| *H04W 48/06* | (2009.01) | |
| *H04W 76/02* | (2009.01) | |
| *H04W 88/06* | (2009.01) | |

(52) U.S. Cl.
CPC ........ *H04L65/1006* (2013.01); *H04L 65/1016* (2013.01); *H04L 65/1069* (2013.01); *H04L 65/1073* (2013.01); *H04L 65/602* (2013.01); *H04L 65/608* (2013.01); *H04L 65/80* (2013.01); *H04N 7/141* (2013.01); *H04N 7/147* (2013.01); *H04W 8/005* (2013.01); *H04W 8/22* (2013.01); *H04W 24/06* (2013.01); *H04W 28/0289* (2013.01); *H04W 36/0066* (2013.01); *H04W 52/0212* (2013.01); *H04W 60/00* (2013.01); *H04W 72/0486* (2013.01); *H04W 72/1231* (2013.01); *H04W 76/023* (2013.01); *H04W 76/048* (2013.01); *H04W 88/02* (2013.01); *H04L 47/10* (2013.01); *H04W 48/06* (2013.01); *H04W 76/027* (2013.01); *H04W 76/068* (2013.01); *H04W 88/06* (2013.01); *Y02B 60/50* (2013.01)

(56) References Cited

U.S. PATENT DOCUMENTS

| | | | |
|---|---|---|---|
| 5,686,957 A | 11/1997 | Baker | |
| 5,963,203 A | 10/1999 | Goldberg et al. | |
| 6,104,721 A | 8/2000 | Hsu | |
| 6,573,907 B1 | 6/2003 | Madrane et al. | |
| 7,724,972 B2 | 5/2010 | Wang et al. | |
| 8,009,735 B2 | 8/2011 | Le Leannec et al. | |
| 8,019,175 B2 | 9/2011 | Lee et al. | |
| 8,331,760 B2 | 12/2012 | Butcher | |
| 8,358,613 B1 | 1/2013 | Giallorenzi et al. | |
| 8,364,698 B2 | 1/2013 | Delgo et al. | |
| 8,452,902 B2 | 5/2013 | Jang et al. | |
| 8,570,359 B2 | 10/2013 | Ali et al. | |
| 8,711,198 B2 | 4/2014 | Malzbender et al. | |
| 8,830,892 B2 | 9/2014 | Chung et al. | |
| 8,842,919 B2 | 9/2014 | Katz et al. | |
| 8,922,718 B2 | 12/2014 | House et al. | |
| 8,970,653 B2 | 3/2015 | Bowen et al. | |
| 8,977,063 B2 | 3/2015 | Lee et al. | |
| 9,031,974 B2 | 5/2015 | Delgo et al. | |
| 9,055,216 B1 | 6/2015 | Taylor | |
| 2004/0192211 A1* | 9/2004 | Gallagher et al. | ......... 455/67.11 |
| 2005/0143084 A1* | 6/2005 | Cheng | .................... H04W 8/24 455/452.2 |
| 2005/0202823 A1 | 9/2005 | Shaheen et al. | |
| 2006/0238444 A1 | 10/2006 | Wang et al. | |
| 2008/0096566 A1* | 4/2008 | Brunner et al. | ................ 455/437 |
| 2008/0141239 A1 | 6/2008 | Larsson et al. | |
| 2009/0017826 A1* | 1/2009 | Shaheen | ........... H04W 36/0016 455/442 |
| 2009/0040955 A1 | 2/2009 | Jung et al. | |
| 2009/0111478 A1 | 4/2009 | Jallon | |
| 2009/0147685 A1 | 6/2009 | Malhotra et al. | |
| 2009/0210766 A1 | 8/2009 | Katayama et al. | |
| 2009/0280802 A1 | 11/2009 | Chin et al. | |
| 2009/0323613 A1 | 12/2009 | Frederiksen et al. | |
| 2010/0026781 A1 | 2/2010 | Ali et al. | |
| 2010/0045773 A1 | 2/2010 | Ritchey | |
| 2010/0067433 A1 | 3/2010 | Cheng et al. | |
| 2010/0074182 A1 | 3/2010 | Shao | |
| 2010/0081391 A1 | 4/2010 | Suzuki et al. | |
| 2010/0118111 A1 | 5/2010 | Bouazizi | |
| 2010/0130237 A1 | 5/2010 | Kitazoe et al. | |
| 2010/0202476 A1 | 8/2010 | Chun et al. | |
| 2010/0202561 A1 | 8/2010 | Gorokhov et al. | |
| 2010/0208607 A1 | 8/2010 | Chin et al. | |
| 2010/0220652 A1 | 9/2010 | Ishii et al. | |
| 2010/0238805 A1 | 9/2010 | Ludwig et al. | |
| 2010/0317394 A1 | 12/2010 | Harris et al. | |
| 2011/0019633 A1 | 1/2011 | Tajima et al. | |
| 2011/0109716 A1 | 5/2011 | Choi | |
| 2011/0161441 A1 | 6/2011 | Haruna et al. | |
| 2011/0195710 A1 | 8/2011 | Nas et al. | |
| 2011/0217980 A1* | 9/2011 | Faurie et al. | ................ 455/435.1 |
| 2011/0217985 A1 | 9/2011 | Gorokhov | |
| 2011/0235706 A1 | 9/2011 | Demircin et al. | |
| 2011/0242975 A1 | 10/2011 | Zhao et al. | |
| 2011/0250888 A1 | 10/2011 | Ryu et al. | |
| 2011/0258313 A1 | 10/2011 | Mallik et al. | |
| 2011/0263255 A1* | 10/2011 | Alonso-Rubio | ...... H04W 36/32 455/436 |
| 2011/0268084 A1 | 11/2011 | Tanabe et al. | |
| 2012/0008574 A1 | 1/2012 | Xiao et al. | |
| 2012/0087396 A1 | 4/2012 | Nimbalker et al. | |
| 2012/0122440 A1 | 5/2012 | Krishnamurthy et al. | |
| 2012/0151009 A1* | 6/2012 | Bouazizi | ............. H04L 41/5067 709/219 |
| 2012/0176884 A1 | 7/2012 | Zhang et al. | |
| 2012/0281621 A1 | 11/2012 | Lotfallah et al. | |
| 2012/0287881 A1* | 11/2012 | Arnott et al. | ................... 370/329 |
| 2012/0307794 A1 | 12/2012 | Shaheen et al. | |
| 2012/0320141 A1 | 12/2012 | Bowen et al. | |
| 2013/0039180 A1 | 2/2013 | Hong et al. | |
| 2013/0039339 A1 | 2/2013 | Rayavarapu et al. | |
| 2013/0040671 A1* | 2/2013 | Zawaideh | ............. H04W 88/06 455/500 |
| 2013/0044697 A1 | 2/2013 | Yoo et al. | |
| 2013/0045707 A1 | 2/2013 | Lee et al. | |
| 2013/0051277 A1 | 2/2013 | Hakola et al. | |
| 2013/0101036 A1 | 4/2013 | Zhou | |
| 2013/0170415 A1 | 7/2013 | Fukuta et al. | |
| 2013/0170479 A1 | 7/2013 | Fong et al. | |
| 2013/0195074 A1* | 8/2013 | Keller | ............... H04W 36/0027 370/331 |
| 2013/0201824 A1 | 8/2013 | Venkatachalam et al. | |
| 2013/0258919 A1 | 10/2013 | Damnjanovic | |
| 2013/0301501 A1 | 11/2013 | Olvera-Hernandez et al. | |
| 2014/0176663 A1 | 6/2014 | Cutler et al. | |
| 2014/0219088 A1 | 8/2014 | Oyman et al. | |
| 2014/0225918 A1 | 8/2014 | Mittal et al. | |
| 2014/0286215 A1 | 9/2014 | Koc et al. | |
| 2014/0295864 A1* | 10/2014 | Gunnarsson et al. | ......... 455/450 |
| 2014/0320587 A1 | 10/2014 | Oyman | |
| 2014/0321272 A1 | 10/2014 | Bangolae et al. | |
| 2014/0321343 A1 | 10/2014 | Gupta et al. | |
| 2014/0321360 A1 | 10/2014 | Han et al. | |
| 2014/0321369 A1 | 10/2014 | Davydov et al. | |
| 2014/0323128 A1 | 10/2014 | Zaus et al. | |
| 2014/0325078 A1 | 10/2014 | Shan et al. | |
| 2015/0195490 A1 | 7/2015 | Oyman et al. | |

FOREIGN PATENT DOCUMENTS

| | | |
|---|---|---|
| CN | 105052202 A | 11/2015 |
| CN | 1051103622 A | 11/2015 |
| EP | 2849494 A1 | 3/2015 |
| EP | 2979373 A | 2/2016 |
| KR | 20080067273 A | 7/2008 |
| KR | 1020090006281 A | 1/2009 |

(56) References Cited

FOREIGN PATENT DOCUMENTS

| KR | 20100054015 A | 5/2010 |
|---|---|---|
| KR | 1020110051787 A | 5/2011 |
| KR | 1020110102935 A | 9/2011 |
| KR | 1020120099805 A | 9/2012 |
| TW | 201246954 A | 11/2012 |
| TW | 201301920 A | 1/2013 |
| TW | 201446026 A | 12/2014 |
| TW | 201501498 A | 1/2015 |
| TW | 201507374 A | 2/2015 |
| WO | WO-2007053851 A2 | 5/2007 |
| WO | WO-2012065658 A1 | 5/2012 |
| WO | WO-2013025040 A2 | 2/2013 |
| WO | WO-2014160765 A1 | 10/2014 |
| WO | WO-2014176058 A1 | 10/2014 |
| WO | WO-2014176087 A1 | 10/2014 |
| WO | WO-2014176089 A1 | 10/2014 |
| WO | WO-2014176106 A1 | 10/2014 |
| WO | WO-2014176200 A1 | 10/2014 |
| WO | WO-2014176245 A1 | 10/2014 |
| WO | WO-2014176480 A1 | 10/2014 |

OTHER PUBLICATIONS

U.S. Appl. No. 14/109,121, Non Final Office Action mailed Apr. 29, 2015, 6 pgs.
U.S. Appl. No. 14/109,121, Non Final Office Action mailed Aug. 14, 2015, 8 pgs.
U.S. Appl. No. 14/109,121, Response filed Jul. 28, 2015 to Non Final Office Action mailed Apr. 29, 2015, 10 pgs.
U.S. Appl. No. 14/132,525, Examiner Interview Summary mailed May 28, 2015, 3 pgs.
U.S. Appl. No. 14/132,525, Non Final Office Action mailed May 7, 2015, 15 pgs.
U.S. Appl. No. 14/132,525, Response filed Aug. 7, 2015 to Non Final Office Action mailed May 7, 2015, 14 pgs.
U.S. Appl. No. 14/132,974, Non Final Office Action mailed Jul. 10, 2015, 8 pgs.
U.S. Appl. No. 14/135,265, Non Final Office Action mailed Jul. 29, 2015, 11 pgs.
U.S. Appl. No. 14/140,823, Non Final Office Action mailed Aug. 5, 2015, 6 pgs.
U.S. Appl. No. 14/140,823, Preliminary Amendment filed Mar. 26, 2014, 3 pgs.
U.S. Appl. No. 14/141,034, Preliminary Amendment filed Dec. 26, 2014, 7 pgs.
U.S. Appl. No. 14/141,985, Non Final Office Action mailed Jul. 8, 2015, 20 pgs.
"Control Signaling to Support for Enhanced DL MIMO", R1-104021, 3GPP TSG RAN WG1 Meeting #61bis, (2010), 6 pgs.
"Discussion on scenarios for evaluation of interference cancellation and suppression schemes", R1-130927, 3GPP TSG-RAN WG1 #72bis, (2013), 3 pgs.
International Application Serial No. PCT/US2014/031845, International Search Report mailed Aug. 26, 2014, 3 pgs.
International Application Serial No. PCT/US2014/031845, Written Opinion mailed Aug. 26, 2014, 4 pgs.
International Application Serial No. PCT/US2014/033965, International Search Report mailed Aug. 7, 2014, 3 pgs.
International Application Serial No. PCT/US2014/033965, Written Opinion mailed Aug. 7, 2014, 5 pgs.
International Application Serial No. PCT/US2014/034307, International Search Report mailed Aug. 11, 2014, 3 pgs.
International Application Serial No. PCT/US2014/034307, Written Opinion mailed Aug. 11, 2014, 5 pgs.
International Application Serial No. PCT/US2014/034337, International Search Report mailed Aug. 8, 2014, 3 pgs.
International Application Serial No. PCT/US2014/034337, Written Opinion mailed Aug. 8, 2014, 6 pgs.
International Application Serial No. PCT/US2014/034480, International Search Report mailed Aug. 26, 2014, 3 pgs.
International Application Serial No. PCT/US2014/034480, Written Opinion mailed Aug. 26, 2014, 4 pgs.
International Application Serial No. PCT/US2014/034879, International Search Report mailed Aug. 28, 2014, 3 pgs.
International Application Serial No. PCT/US2014/034879, Written Opinion mailed Aug. 28, 2014, 8 pgs.
International Application Serial No. PCT/US2014/034966, International Search Report mailed Aug. 22, 2014, 3 pgs.
International Application Serial No. PCT/US2014/034966, Written Opinion mailed Aug. 22, 2014, 5 pgs.
International Application Serial No. PCT/US2014/035409, International Search Report mailed Aug. 26, 2014, 4 pgs.
International Application Serial No. PCT/US2014/035409, Written Opinion mailed Aug. 26, 2014, 6 pgs.
Taiwanese Application Serial No. 103113875, Amendment filed Oct. 16, 2014, English Translation, 2 pgs.
"Views on the use of DM RS ports / scrambling sequences for MU-MIMO", R1-103830, 3GPP TSG-RAN WG1 Meeting #61bis, (2010), 6 pgs.
Suckchel, Yang, "An Adaptive Discontinuous Reception Mechanism Based on Extended Paging Indicator for Power Saving in UMTS", In: Vehicular Technology Conference, VTC-2006 Fall. IEEE 64th, [Online]. Retrieved from the Internet: <http://i.eexplore.ieee.org/stamp/stamp.jsparnumber=4109444>, (2006), 5 pgs.
U.S. Appl. No. 14/109,121, Corrected Notice of Allowance mailed Jan. 7, 2016, 2 pgs.
U.S. Appl. No. 14/109,121, Notice of Allowance mailed Nov. 25, 2015, 9 pgs.
U.S. Appl. No. 14/109,121, Response filed Nov. 13, 2015 to Non Final Office Action mailed Aug. 14, 2015, 10 pgs.
U.S. Appl. No. 14/132,525, Notice of Allowance mailed Dec. 22, 2015, 9 pgs.
U.S. Appl. No. 14/132,974, Notice of Allowance mailed Nov. 16, 2015, 7 pgs.
U.S. Appl. No. 14/132,974, Response filed Oct. 2, 2015 to Non Final Office Action mailed Jul. 10, 2015, 7 pgs.
U.S. Appl. No. 14/135,265, Response filed Oct. 28, 2015 to Non Final Office Action mailed Jul. 29, 2015, 8 pgs.
U.S. Appl. No. 14/140,823, Non Final Office Action mailed Nov. 23, 2015, 11 pgs.
U.S. Appl. No. 14/140,823, Response filed Nov. 5, 2015 to Non Final Office Action mailed Aug. 5, 2015, 7 pgs.
U.S. Appl. No. 14/141,985, Notice of Allowance mailed Oct. 26, 2015, 18 pgs.
U.S. Appl. No. 14/141,985, Response filed Oct. 2, 2015 to Non Final Office Action mailed Jul. 8, 2015, 7 pgs.
International Application Serial No. PCT/US2014/031845, International Preliminary Report on Patentability mailed Oct. 8, 2015, 6 pgs.
International Application Serial No. PCT/US2014/033965, International Preliminary Report on Patentability mailed Nov. 5, 2015, 7 pgs.
International Application Serial No. PCT/US2014/034307, International Preliminary Report on Patentability mailed Nov. 5, 2015, 7 pgs.
International Application Serial No. PCT/US2014/034337, International Preliminary Report on Patentability mailed Nov. 5, 2015, 8 pgs.
International Application Serial No. PCT/US2014/034480, International Preliminary Report on Patentability mailed Nov. 5, 2015, 6 pgs.
International Application Serial No. PCT/US2014/034879, International Preliminary Report on Patentability mailed Nov. 5, 2015, 10 pgs.
International Application Serial No. PCT/US2014/034966, International Preliminary Report on Patentability mailed Nov. 5, 2015, 7 pgs.
International Application Serial No. PCT/US2014/035409, International Preliminary Report on Patentability mailed Nov. 5, 2015, 8 pgs.
Taiwanese Application Serial No. 103113700, Office Action mailed Oct. 28, 2015, W/ English Search Report, 9 pgs.

(56) References Cited

OTHER PUBLICATIONS

Taiwanese Application Serial No. 103113875, Office Action mailed Oct. 8, 2015, W/ English Translation, 22 pgs.

Taiwanese Application Serial No. 103113875, Response filed Jan. 13, 2016 to Office Action mailed Oct. 8, 2015, (English Translation of Claims), 13 pgs.

Taiwanese Application Serial No. 103113897, Office Action mailed Dec. 14, 2015, W/ English Search Report, 7 pgs.

Taiwanese Application Serial No. 103113898, Office Action mailed Sep. 17, 2015, W/ English Search Report, 9 pgs.

"Views on the use of DM RS ports / scrambling sequences for MU-MIMO", 3GPP TSG-RAN WG1 Meeting #61bis R1-103830 Dresden, (Jun. 28-Jul. 2, 2010).

* cited by examiner

USER EQUIPMENT AND METHOD FOR FEEDBACK OF USER EQUIPMENT PERFORMANCE METRICS DURING DYNAMIC RADIO SWITCHING

RELATED APPLICATION

This application claims the benefit of priority under 35 U.S.C. 119(e) to U.S. Provisional Patent Application Ser. No. 61/816,662, filed Apr. 26, 2013, which is incorporated herein by reference in its entirety.

TECHNICAL FIELD

Embodiments described herein generally relate to wireless networks. Some embodiments relate generally to user equipment feedback in a wireless network.

BACKGROUND

Wireless, radio access networks (RAN) enable mobile devices (e.g., radiotelephones, cellular telephones, user equipment (UE)) to communicate within that network with a fixed landline infrastructure (e.g., base station, evolved node B (eNodeB)). For example, these radio access networks can include WiFi™, 3$^{rd}$ Generation Partnership Projects (3GPP), or Bluetooth™

Typical UEs may be equipped with multiple radios. While it may be desirable to actively transmit on only one radio during an active session due to hardware limitations, energy efficiency considerations, and an overall system performance perspective, it may also be desirable to move the active session across multiple radio access technologies (RATs) in a seamless fashion.

There are general needs for dynamic radio switching in user equipment.

DETAILED DESCRIPTION

Subsequent use of the term radio access technology (RAT) may refer to a radio dedicated to a particular wireless technology. As is known by one of ordinary skill in the art, a RAT refers to an underlying physical connection method for a radio based communication network. Each radio may be configured to support a different RAT (e.g., WiFi™, 3GPP, Bluetooth™, 4G, Long Term Evolution (LTE)). The WiFi™ may be part of an IEEE 802.11 standard.

The term "base station" may be used subsequently to refer to any fixed transceiver apparatus that may communicate using one or more particular radio technologies. For example, base station can refer to an access point, an eNodeB, or a cell site.

User equipment (UE) may include a plurality of radios each associated with a different RAT of multiple RATs that may select various networks or be "steered" to those networks. For example, the UE RATs can employ network selection or traffic steering between different radio access networks (RAN) such as WiFi™, 3GPP, Bluetooth™, 4G, LTE, or other wireless networks. Several solutions, based on UE-centric and network centric techniques may be used for load balancing between one network using a first radio technology (e.g., 3GPP) and second network using a second radio technology (e.g., wireless local area network (WLAN)).

While the UE may be equipped with multiple radios, often it is still desirable to actively transmit on only one radio at a time due to hardware limitations, energy efficiency considerations, and/or an overall system performance perspective. It may also be desirable to move a given active session across one or more (RATs) in a seamless fashion such that minimal disruption to application performance may be observed by the user. For example, this may be true when moving a real-time application flow across RATs or when the channel or interference environment across RATs is changing dynamically. One example of moving a real-time application flow across RATs may be when the UE is using a WiFi RAT in a WiFi network for video streaming may have the flexibility to switch to LTE to receive the remainder of the video stream using an LTE RAT.

While several architectures and mobility protocols support fast session transfer, the overall user application state at the time of the session transfer is still unavailable at the new radio network at the time of the transfer. The state and metrics associated with the application may be useful for the radio network in allocating radio resources to better maintain application quality of service (QoS). For example, a proportional fair media access control (MAC) scheduler for a given RAT may rely on past throughput of the user to make its scheduling decisions across users. Unavailability of a user's past throughput knowledge may degrade user/system performance until the system achieves steady state again.

When UEs are allowed to dynamically switch between different radios, there may be a temporary performance degradation during the RAT transition. For example, cooperation between two or more radio networks may not be available because the two radios on the network side may not be collocated in the same physical devices or a backhaul interface cannot support high signaling overhead for RAT coordination.

These and other problems may be solved by the UE feeding back its application state/performance metrics to the new RAT at the time a session is transferred to the new RAT. There may be a performance improvement when such feedback is made available to the new radio network. Thus, it may be important for the UE to feedback the past user performance indicator(s) (e.g., throughput) of their past application performance to the new network controller/scheduler in order to assist the scheduler of the new RAT.

The user or application performance indicator may be fed back along with the message used to trigger the switching to the new radio network. The performance indicator may also be fed back in a separate message following the message used to trigger the switching. In such an embodiment, the delay between the session transfer and the feedback of the performance indicator should be reduced as much as possible.

The past performance indicators may be part of the metric that the scheduler uses to determine how to efficiently and fairly allocate resources to its users (e.g., UEs). Therefore, with UE feedback of such performance indicators to their new radio, the schedulers may allocate the resources based on more accurate metrics and, hence, improve the overall performance.

The UE may also feedback certain QoS metrics per application. The network can then allocate resources to maintain a desired QoS of the application without interruption.

Examples of UE/application performance metrics may include: UE time-averaged throughput for a proportional-fair scheduler, video buffer size for streaming data, and/or quality of experience (QoE) metrics. These performance metrics are for purposes of illustration only. The present embodiments are not limited to any certain performance metrics.

The UE may feedback its past time-averaged throughput measured over a certain time window (i.e., latency time scale of the scheduler) to the new RAT. A proportional-fair scheduler aims to optimize the sum log throughput of its users. The sum log throughput may be a metric that balances between total data rate and UE fairness. When performing resource allocation, a proportional-fair scheduler may compare the metric, instantaneous rate divided by smooth-throughput, and selects the UE with the highest value of the metric to be scheduled. By providing the smooth-throughput metric, the overall performance for proportional-fair schedulers may be improved and network-wide sum log throughput can be improved without disruption due to session transfer.

Figure 1:
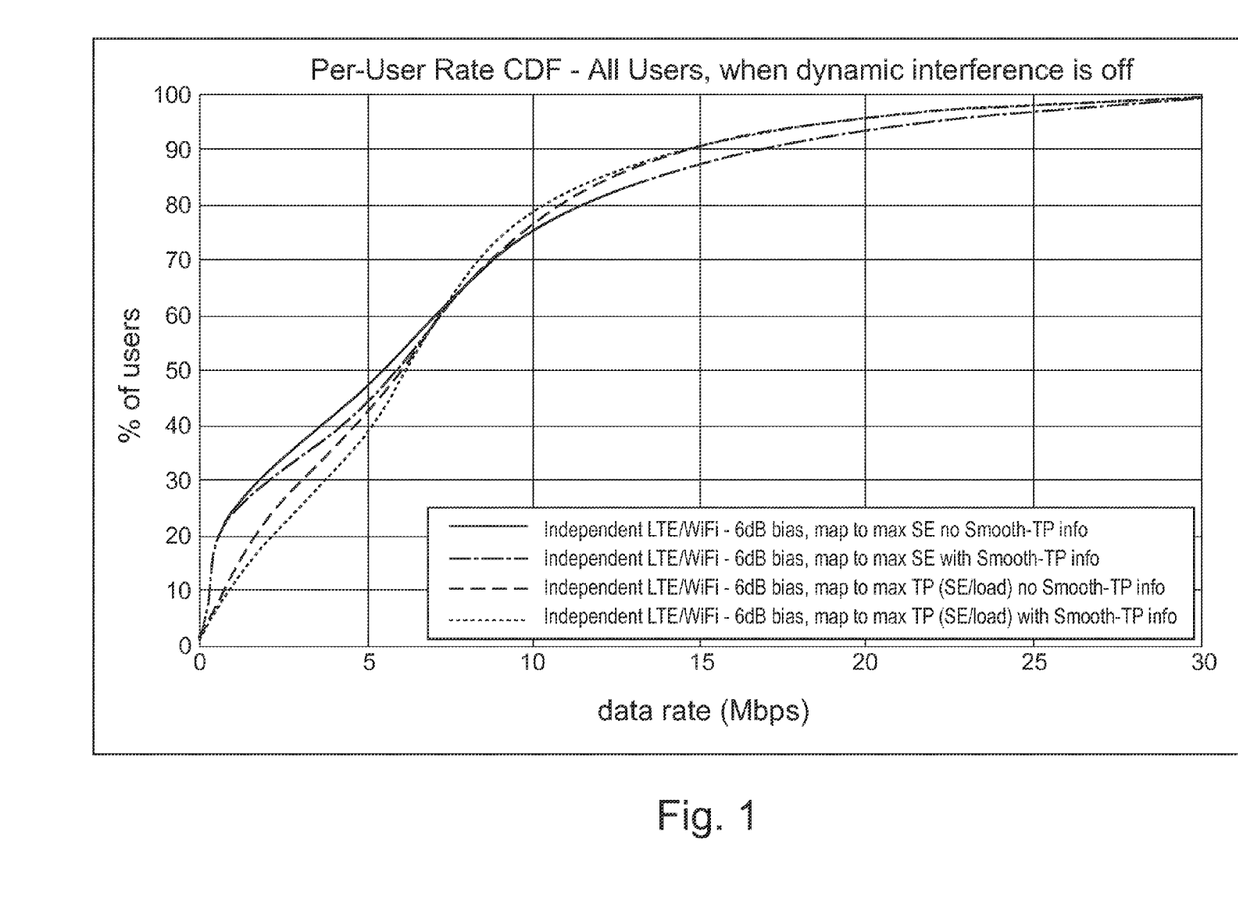
FIG. 1 illustrates a plot of percent of users versus data rate in accordance with a method for feedback of user equipment performance metrics.

FIG. 1 illustrates a plot of percent of users versus data rate (Mbps). The figure shows that, with feedback of the time-averaged throughput metric, the overall fairness may be improved for two different UE-centric RAT selection rules.

Other examples of throughput-based metrics may include measurements related to "on-time" throughput. On-time throughput may capture the probability of receiving a packet before its delay deadline. This metric may be useful for a scheduler that has maximized a number of UE receiving their targeted on-time throughput.

The UE may also feedback their video buffer size for streaming data. The buffer size may be fed back to the new radio if the UE is receiving streaming video from the base station. When the UE connects to only one radio, the scheduler may have a reasonable estimate of the buffer size based on acknowledgement messages from the UE. However, when the UE is switched to a different RAT, the scheduler may no longer have an estimate on the buffer size of the video. Though such information may be exchanged among the schedulers through a backbone, the UE feedback can be a more timely approach to ensure a smooth transition between RATs.

The UE may also feedback QoE metrics to the new RAT. QoE metrics include, but are not limited to, throughput, metrics indicating acceptable video viewing quality (e.g., few dropped frames, low jittering), or metrics indicating acceptable voice over internet protocol (VoIP) conversation (e.g., short packet delay, no interruption of the conversation).

Figure 2:
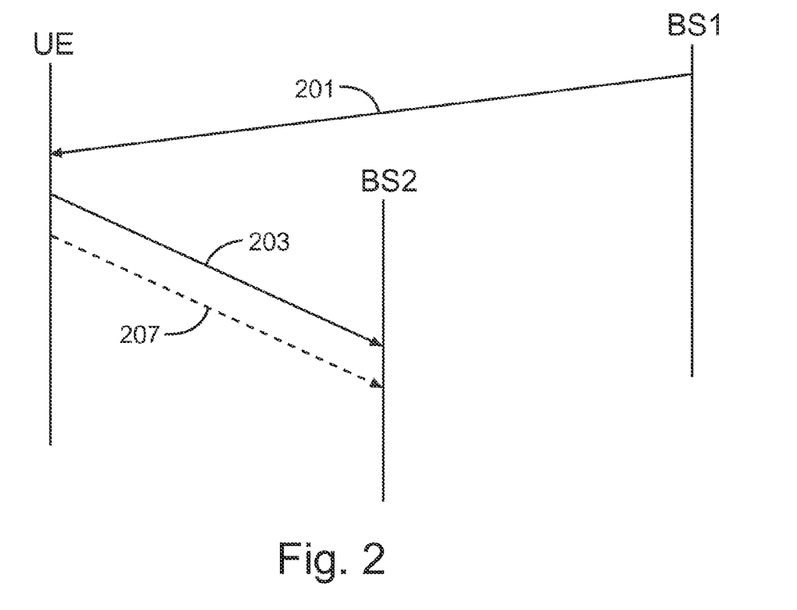
FIG. 2 illustrates an embodiment of a signal flow diagram in accordance with the method for feedback of user equipment performance metrics.

FIG. 2 illustrates a signal flow diagram for a session transfer between RATs with UE feedback of performance metrics. The UE receives an indication 201 from a first base station (BS1), associated with a first RAT, that the UE should switch its session to a second base station (BS2). The UE transmits a message 203 to the second base station to trigger the switch. As part of that message or in an optional separate message 207, the UE transmits its performance metrics to the second base station. During this session switch, the UE also switches its internal radio from the RAT associated with the first base station to the RAT associated with the second base station.

As an example of operation, the first base station may be a 3GPP eNodeB and the second base station may be a WiFi access point. The UE may be running a session wherein it is streaming video from the first base station. As the UE moves away from the first base station and closer to the second base station, the first base station instructs the UE to switch. The UE determines that the second base station is the closest base station and switches its session to the second base station necessitating switching from the 3GPP RAT to the WiFi RAT.

The UE feedback of performance metrics during dynamic RAT switching may improve RAT switching in multi-RAT networks. The UE feedback indicators/metrics of application performance to overcome the lack of information exchange between schedulers of uncoordinated RATs. The performance indicators may provide useful information to the new scheduler to improve the proportional fair throughput as well as the QoE performance across applications. By aggregating the performance indicator feedback with the RAT selection decision, the information may be immediately used and performance disruption may be reduced.

Figure 3:
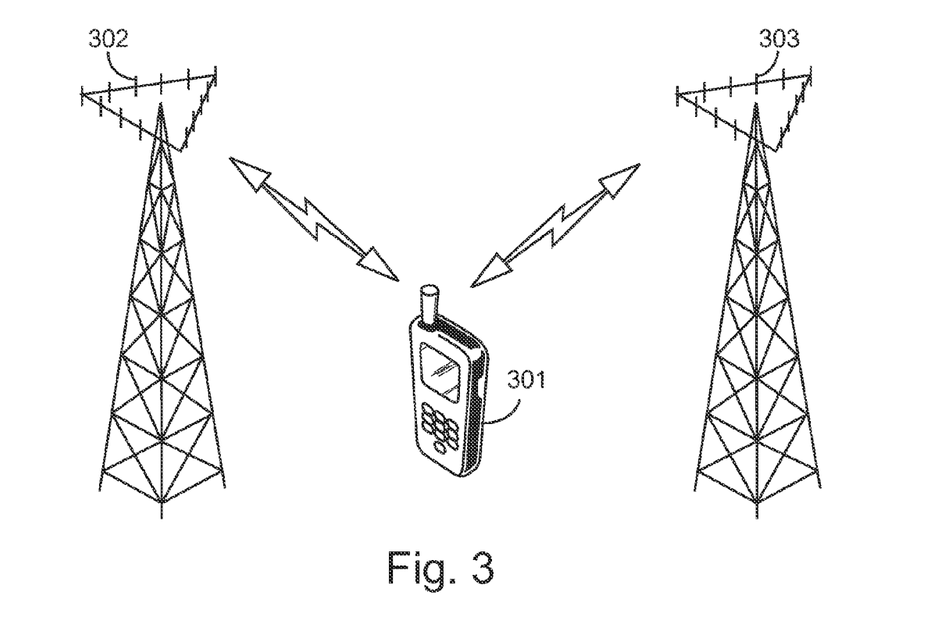
FIG. 3 illustrates a diagram of an embodiment of a communication system.

FIG. 3 illustrates a diagram of an embodiment of a wireless communication system comprising the UE in a multiple base station environment. The illustrated communication system includes a plurality of antennas 302, 303 for communicating with the UE 301.

The antennas 302, 303 may be eNodeB's and/or base stations for communicating in a cellular environment. The antennas 302, 303 may also be access points (AP) for communicating in a WiFi environment. For example, the first antenna 302 may be an eNodeB with a base station to enable the UE 301 to communicate in a 3GPP environment while the second antenna 303 may be an access point to enable the UE 301 to communicate in a WiFi environment.

The method for UE feedback of performance metrics may be used in the communication system to enable it to seamlessly switch between the 3GPP environment to the WiFi environment. In such a scenario, the UE 301 may be executing an application that is interfacing with the 3GPP antenna 302 by streaming video. As the UE 3012 moves away from the 3GPP antenna 302 and gets within range of the WiFi AP 303, the UE transmits its performance metrics to the WiFi AP 303 RAT prior to switching to the UE 301 switching from using its 3GPP RAT to its WiFi RAT. This switches the UE 301 from communicating with the 3GPP eNodeB 302 to the WiFi access point 303. Such a switch may be accomplished using the signaling method illustrated in FIG. 2.

The UE 301 may thus switch from a first radio associated with a first RAT of the communication system to a second radio associated with a second RAT of the communication system. Each of the RATs may be associated with a different network or communication system. For example, the first antenna 302 may be part of a first network or communication system and the second antenna 303 may be part of a second network or communication system.

In the above embodiments, the user performance metric may be fed back to the base station/access point (BS/AP) to help in making scheduling decisions. The user performance metric can be exchanged across RATs within UEs and UEs may then feed back this information to their BS/AP through the new UE RAT. Additionally, the user performance metric can be fed back through the old RAT and exchanged between BS's/AP's over a backbone or between schedulers for different RATs if the two RATs are located in the same AP.

Figure 4:
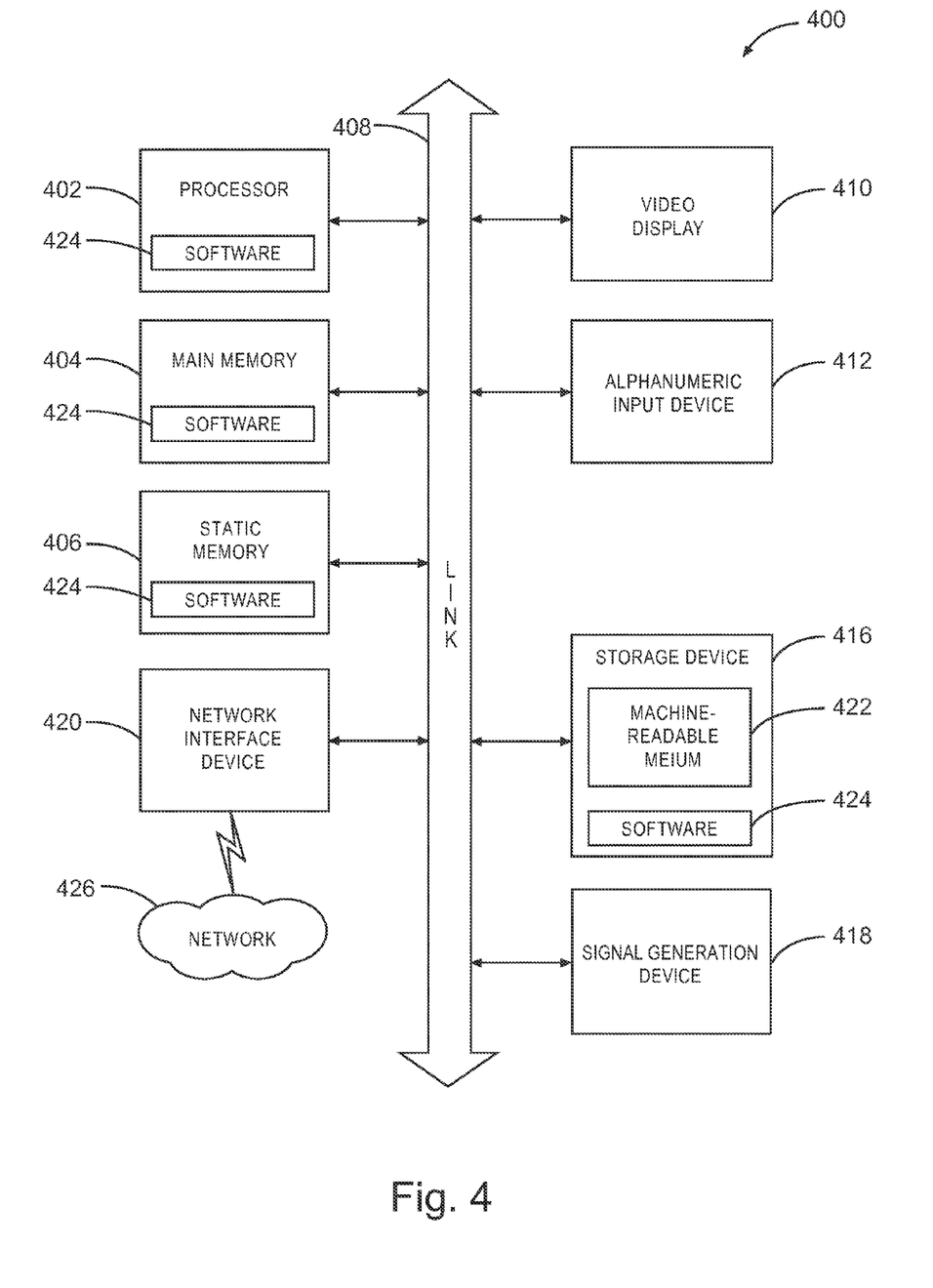
FIG. 4 illustrates a block diagram of an embodiment of user equipment.

FIG. 4 is a block diagram illustrating a machine in the example form of user equipment 400, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a mobile communication device (e.g., cellular telephone), a computer, a personal computer (PC), a tablet PC, a hybrid tablet, a personal digital assistant (PDA), or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example user equipment 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The user equipment 400 may further include a video display unit 410 and an alphanumeric input device 412 (e.g., a keypad). In one embodiment, the video display unit 410 and input device 412 are incorporated into a touch screen display. The user equipment 400 may additionally include a storage device 416 (e.g., a drive unit), a signal generation device 418 (e.g., a speaker), a network interface device 420, and one or more sensors (not shown).

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the user equipment 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), a wireless local area network (WLAN) the Internet, mobile telephone networks, plain old telephone (POTS) networks, and wireless data networks (e.g., WI-FI™ (IEEE 802.11), 3GPP, 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software. The network interface device may include one or more antennas for communicating with the wireless network.

What is claimed is:

1. A method for dynamic radio switching with user equipment (UE) feedback of UE performance metrics, the UE having a plurality of UE radios, the method comprising:
    the UE receiving a first message to switch from a first base station radio, of a first base station, associated with a first radio access technology (RAT) of a communication system to a second base station radio, of a second base station, associated with a second RAT of the communication system;
    the UE transmitting a second message to the second base station radio, in response to the first message, to trigger a switch from the first base station radio to the second base station radio, the second message comprising the first message and the UE performance metrics, wherein the UE performance metrics comprise at least one of a UE application state, UE time-averaged throughput for a proportional-fair scheduler, a UE video buffer size for streaming data UE quality of experience (QuE) metrics; and
    the UE switching, in response to the first message, an active UE transmission session from a first UE radio of the plurality of UE radios to a second UE radio of the plurality of UE radios, the first UE radio associated with the first RAT and the second UE radio associated with the second RAT.

2. The method of claim 1 wherein the QoE metrics comprise throughput, metrics indicating acceptable video viewing quality, or metrics indicating acceptable voice over internet protocol (VoIP) conversation.

3. The method of claim.1 wherein the UE transmitting the UE performance metrics to the second base station radio comprises transmitting a past time-averaged UE throughput measured over a predetermined time window.

4. The method of claim 1 wherein the performance metrics comprise past application performance of an application being executed by the UE.

5. The method of claim 1 wherein the UE transmitting the performance metrics to the second base station radio comprises the UE transmitting the performance metrics during session transfer.

6. The method of claim 1 wherein the performance metrics are part of a metric used by a scheduler of the communication system to determine how to allocate resources to different UEs.

7. User equipment (UE) for operating in a plurality of wireless networks, the user equipment comprising:
    a network interface device to communicate with a plurality of base stations each having an antenna, the network interface device to receive a transfer session indication from a first base station of the plurality of base stations to transfer an active UE transmission session from the first base station to a second base station of the plurality of base stations, wherein the first base station communicates using a first base station radio associated with a first radio access technology and the second base station communicates using a second base station radio associated with a second radio access technology;
a plurality of UE radios, each UE radio of the plurality of UE radios to operate on a different radio access technology; and
a processor coupled to the network interface and the plurality of UE radios to control operation of the user equipment and dynamically switch from a first UE radio of the plurality of UE radios to a second UE radio of the plurality of UE radios in response to a received message from the first base station radio, the operation: determines UE performance metrics and controls transmission of a switch message to the second base station radio, in response to the received message, to switch the UE from the first base station radio to the second base station radio, wherein the switch message comprises the received message and the UE performance metrics, the UE performance metrics including at least one of a UE application state, UE time-averaged throughput for a proportional-fair scheduler, a UE video buffer size for streaming data, or UE quality of experience (QoE) metrics.

8. The user equipment of claim 7 wherein the plurality of radios each operate on one of IEEE 802.11, 3GPP, 4G LTE/LTE-A or WiMAX network radio access technology.

9. A non-transitory computer-readable storage medium that stores instructions for execution by one or more processors for dynamic radio switching of user equipment (UE), wherein the instructions to switch the UE comprise:
receive a first message at the UE to switch from a first base station radio, of a first base station, associated with a first radio access technology (RAT) of a communication system to a second base station radio, of a second base station, associated with a second RAT of the communication system;
transmit a second message from the UE to the second base station radio, in response to the first message, to trigger a switch from the first base station radio to the second base station radio, the second message comprising the first message and the UE performance metrics, wherein the UE performance metrics comprise at least one of a UE application state, UE time-averaged throughput for a proportional-fair scheduler, a UE video buffer size for streaming data, or UE quality of experience (QoE) metrics; and
switch an active transmission session of the UE from a first UE radio of the plurality of UE radios to a second UE radio of the plurality of UE radios in response to the first message, the first UE radio associated with the first RAT and the second UE radio associated with the second RAT.

* * * * *